Patented June 21, 1927.

1,633,067

UNITED STATES PATENT OFFICE.

CHARLES E. BURKE, OF WILMINGTON, DELAWARE, ASSIGNOR, BY MESNE ASSIGNMENTS, TO DU PONT VISCOLOID COMPANY, OF WILMINGTON, DELAWARE, A CORPORATION OF DELAWARE.

FIREPROOFED PRODUCT AND THE PRODUCTION THEREOF.

No Drawing.   Application filed January 2, 1926. Serial No. 79,037.

This invention is in the art of reducing the flammability of products of various kinds, as compositions, articles, and so on which, as commonly made, have a flammability that, experience has shown, it is desirable to substantially reduce or eliminate. Particularly the invention has to do with the reduction of the flammability of such products by the addition thereto in various ways of a fire-retarding agent. As indicated, the products in question may be of many different types, as fabric, wood, rubber, paints, varnishes, cellulose ester and cellulose ether compositions and so on. The fire-retarding agent is, according to the present invention, normal magnesium carbonate tri-hydrate, so-called, a compound having a constitution apparently corresponding to the formula $MgCO_3.3H_2O$.

I have discovered that the mentioned compound is a highly efficient and satisfactory fire-retarding agent and fire-proofing material. Whether incorporated into the body of a composition, or applied to a material, as a fabric, by application of the compound thereto (desirably mixed with an adhesive to serve as a binder), or utilized in any other suitable way, the compound imparts remarkable fire-retarding properties.

Since, as already indicated, the compound may be used in various ways depending upon circumstances and the particular product to be fire-proofed, it will be understood that the various suggestions given herein, as to uses and methods, are given in explanation and exemplification of the invention and not in restriction.

In applying the invention to the fire-proofing of fabric, the surface may be coated with a film of adhesive material, such as varnish or glue, containing the compound, or the fabric may be impregnated with a suitable carrier as thin varnish or glue, containing the compound. Evidently wood and the like can be similarly treated. For instance, a rubber cement, made in the usual way by dissolving crude rubber in benzene (rubber 12, benzene 88, parts by weight) or other suitable solvent, may be used, the hydrated magnesium carbonate being ground into the cement until uniformly and finely distributed. The cement so prepared is applied to the fabric by brushing, coating machine or other convenient way, allowed to dry, and then the rubber cured in the usual way.

In cases where the flexibility of the treated material is not a consideration, as in the case of wood, for example, ordinary paint or varnish may be used as the vehicle for applying the carbonate. The carbonate is ground into the medium as in the case of the rubber cement, and the composition applied in the ordinary way.

In coating compositions, such as paint, glue, cellulose ester and cellulose ether coating compositions, and so forth, the amount of carbonate desirable to use will, of course, vary according to the effect sought. Generally speaking, there may be added to the coating or impregnating composition an amount of carbonate approximately between 5 and 50 percent, preferably about 25 percent, of the weight of the usual non-volatile constituents of the composition; that is, the composition may be made up with the amounts of non-volatile materials, as rubber, glue, gums, pigments, or what not, to give a desired ordinary rubber solution and so on, and in addition there may be added carbonate to give an excess of 5 to 50 percent of non-volatile material.

In the application of the invention to plastic materials, such for example as cellulose nitrate and ethyl cellulose plastics, the composition may, for ethyl cellulose plastic, be as follows (parts by weight):—

|  | Range. | Preferred. |
|---|---|---|
| Ethyl cellulose | 100 | 100 |
| Tricresyl phosphate | 30–200 | 59 |
| Hydrated magnesium carbonate | 40–150 | 63.6 |

The composition may be prepared according to the usual methods of the ethyl cellulose plastic art, the incorporation of the magnesium compound entailing no difficulty. For example, the ethyl cellulose and tricresyl phosphate are mixed in a mixing machine until thoroughly colloided; and then the magnesium compound is added and thoroughly worked in, either in a mixing machine or on the rolls, until thoroughly and evenly distributed. The product may then be caked, sheeted, or treated in any other way desired. For example, the product may be molded into any desired articles for which ethyl cellulose plastics are used, dissolved in suitable solvents to make a lacquer; and so on, as will be understood by those familiar with the utilization of such plastics. For pyroxylin plastics, the composition may be the same as that indicated above, except for the substitution of one hundred parts of pyroxylin for the ethyl cellulose; and the manufacturing methods and uses may be as indicated. Other colloiding agents may, of course, be used in place of the tricresyl phosphate, as other aromatic phosphates (e. g. triphenyl phosphate), camphor, aromatic carbonates, etc.; and other cellulose derivatives, e. g. cellulose acetate, may be used, it being evident that the application of the invention is not limited to particular plastic materials or particular colloiding agents. The combustibility of the resulting product is lowered to such a degree that it is practically non-inflammable, while the properties of the compound, such as plasticity, moldability, and so forth, are satisfactorily retained.

As a further example of the application of the invention cellulosic lacquers may embody the same, such lacquers being initially directly made up, rather than being made by the dissolving of plastic as suggested above. A suitable composition for such a lacquer may be (parts by weight): cellulose derivative, e. g. cellulose nitrate, cellulose acetate, or ethyl cellulose, 12; castor oil 3, tricresyl phosphate 3, methyl alcohol 50, and hydrated magnesium carbonate .9 to 9.

It will be noted from the various examples given that the invention contemplates not only the production of coating compositions which are themselves of reduced inflammability, i. e. non-combustible or of low flammability, but also includes the production of articles coated with such compositions; and also include plastics of reduced inflammability.

Returning to the magnesium compound, several methods of preparing this so-called normal magnesium carbonate tri-hydrate are known and described in the literature; see for example, Gmelin-Kraut, Handbuch der Anorganischen Chemie (Heidelberg 1909), vol. 2, part 2, pages 464 and 465. I have prepared the compound, in a satisfactorily pure state, by mixing a solution of a water-soluble magnesium salt, such as magnesium sulphate ($MgSO_4.7H_2O$) with a solution of sodium carbonate at a temperature of approximately 20° C., allowing the precipitate to remain in contact with the mother liquor for several hours, and then filtering and drying at room temperature. I am aware that the constitution of the compound prepared as above, or by any of the other methods given in the literature, for the preparation of "normal hydrated magnesium carbonate" has been questioned by certain chemists who claim that the compound is not a normal magnesium carbonate but, rather, is a basic bicarbonate, containing two molecules of water of crystallization ($Mg.OH.HCO_3.2H_2O$), but whatever the exact constitution of the compound prepared as above may be, I for definiteness, since the term "normal magnesium carbonate tri-hydrate" is the usual one of the art, use the same as designating the compound prepared as indicated.

As an additional field of use for compositions fire-proofed in accordance with the present invention, I may mention the use of such compositions in coverings for wire for, say, electrical purposes. That is to say, such wire may be wrapped with fabric impregnated or coated with a composition, for example a rubber composition, containing the fire-retarding ingredient; or the wire may be given a coating of rubber composition in the usual way, such composition containing the fire-retarding ingredient. Thus, a composition of (parts by weight) new rubber 5, reclaimed rubber 40, mineral rubber (bitumen) 20, sulphur and accelerator 2, whiting 8, magnesium carbonate 25 may be prepared in the usual way, the carbonate taking the place of an equal amount of whiting, applied to the wire as usual, and vulcanized.

This application is a continuation in part of my application Serial No. 757,338, filed December 22, 1924 on cellulose ester compositions of reduced inflammability.

I claim:

1. A fireproofed product comprising as a fire-retardant, a hydrated carbonate of magnesium.

2. A fireproofed composition of matter containing as a fire-retardant, a hydrated carbonate of magnesium.

3. A fireproofed composition of matter containing as a base a cellulose derivative and as a fire-retardant, a hydrated carbonate of magnesium.

4. A fireproofed plastic composition containing as a base a plasticized cellulose derivative and as a fire-retardant, a hydrated carbonate of magnesium.

5. A composition comprising a cellulose ester, a plasticizing agent, and a hydrated carbonate of magnesium.

6. A composition comprising a cellulose ester, a triaryl phosphate and a hydrated carbonate of magnesium.

7. A composition comprising a cellulose ester, tricresyl phosphate, and a hydrated carbonate of magnesium.

8. A composition having an inflammability substantially less than that of a plastic composed of pyroxylin and camphor, and comprising pyroxylin, a plasticizing agent, and a hydrated carbonate of magnesium.

9. A composition having an inflammability substantially less than that of a plastic composed of pyroxylin and camphor, and comprising pyroxylin, a triaryl phosphate, and a hydrated carbonate of magnesium.

10. A composition having an inflammability substantially less than that of a plastic composed of pyroxylin and camphor, and comprising pyroxylin, tricresyl phosphate, and normal magnesium carbonate tri-hydrate.

11. A composition comprising 100 parts of pyroxylin, from about 30 to 200 parts of a triaryl phosphate and from about 40 to 150 parts of a hydrated carbonate of magnesium.

12. A composition comprising 100 parts of pyroxylin, from about 30 to 200 parts of tricresyl phosphate, and from about 40 to 150 parts of a hydrated carbonate of magnesium.

13. A composition comprising 100 parts of pyroxylin, about 59 parts of tricresyl phosphate, and about 64 parts of normal magnesium carbonate tri-hydrate.

In testimony whereof I affix my signature.

CHARLES E. BURKE.